(12) United States Patent
Bakshi et al.

(10) Patent No.: US 8,000,929 B2
(45) Date of Patent: Aug. 16, 2011

(54) SEQUENTIAL FIXED-POINT QUANTILE ESTIMATION

(75) Inventors: Yury Bakshi, Morganville, NJ (US); David Arthur Hoeflin, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 475 days.

(21) Appl. No.: 12/229,941

(22) Filed: Aug. 28, 2008

(65) Prior Publication Data

US 2009/0138238 A1    May 28, 2009

Related U.S. Application Data

(60) Provisional application No. 61/004,487, filed on Nov. 28, 2007.

(51) Int. Cl.
*G06F 17/18* (2006.01)
(52) U.S. Cl. .................. 702/180; 702/186; 714/47
(58) Field of Classification Search .......... 702/179, 702/180, 181, 182, 188; 714/47
See application file for complete search history.

(56) References Cited

U.S. PATENT DOCUMENTS

| | | | |
|---|---|---|---|
| 5,870,752 A | 2/1999 | Gibbons et al. | |
| 6,904,390 B2 | 6/2005 | Nikitin et al. | |
| 7,076,487 B2 | 7/2006 | Liechty et al. | |
| 7,076,695 B2 * | 7/2006 | McGee et al. | 714/47 |
| 7,188,053 B2 | 3/2007 | Nikitin et al. | |
| 7,219,034 B2 | 5/2007 | McGee et al. | |
| 7,299,248 B2 | 11/2007 | Popivanov | |
| 2006/0241904 A1 | 10/2006 | Middleton | |

OTHER PUBLICATIONS

Bakshi, Y. et al., "Quantile Estimation: A Minimalist Approach", Proc. of the 2006 Winter Simulation Conference, pp. 2140-2145.
Chen, J.E. (2002) "Two-Phase Quantile Estimation", Proc. of the 2002 Winter Simulation Conference, pp. 447-455.
Lee, J.R. et al., Sequential Estimation of Quantiles, Tech Rep. TR-COSC May 1998, Dept. of Computer Science, University of Canterbury, Christchurch, New Zealand.
Chen, F., Lambert, D., and Pinheiro, J.C. (2000). Incremental Quantile Estimation for Massive Tracking. Proceedings of the Sixth ACM SIGKDD International Conference on Knowledge Discovery and Data Mining, 516-522.
Chen, J.E., and Kelton, D.W. (2001). Quantile and Histogram Estimation. Proceedings of the Winter Simulation Conference, 451-459.
Greenwald, M., and Khanna, S. (2001). Space-Efficient Online Computation of Quantile Summaries. Proc. ACM SIGMOD Conference, 47-57.
Manku, G.S., Rajagopalan, S., and Lindsay, B.G. (1998). Approximate Medians and other Quantiles in One Pass and with Limited Memory. In proceedings of the ACM International Conference on Management of Data, 426-435.

* cited by examiner

*Primary Examiner* — John H Le

(57) ABSTRACT

Disclosed are method and apparatus for calculating a quantile estimate of a data stream. A quantile estimate is calculated iteratively by calculating a first quantile estimate and then calculating a second quantile estimate by adding a first update increment to the first estimate. A first observation sample is acquired. A first quantile estimate and a first standard deviation estimate are set to the sample quantile and the sample standard deviation of the first observation sample. A second observation sample is then acquired. A second standard deviation estimate is calculated based at least in part on the first standard deviation estimate and the sample standard deviation of the second observation sample. A first update increment is calculated based at least in part on the second observation sample and based at least in part on the product of the second standard deviation estimate times a log odds ratio function.

28 Claims, 2 Drawing Sheets

SEQUENTIAL FIXED-POINT QUANTILE ESTIMATION

This application claims the benefit of U.S. Provisional Application No. 61/004,487 filed Nov. 28, 2007, which is incorporated herein by reference.

BACKGROUND OF THE INVENTION

The present invention relates generally to statistical analysis of data, and more particularly to quantile estimation.

Statistical analysis of data is a core process for characterizing, analyzing, and controlling systems. In some applications, data may be captured, statically stored in a database, and post-processed. In other applications, however, real-time (or near real-time) analysis of data streams may be required. In a manufacturing process, for example, sensors may monitor process variables (such as temperature, pressure, speed, and chemical concentration) and transmit the values to a control system. The control system may then analyze the data and transmit feedback signals to servo systems to maintain the desired values of the process variables. As another example, operations, administration, maintenance, and provisioning (OAM&P) of telecommunications networks may rely on real-time statistical analysis of traffic parameters such as call volume, call setup time, call duration, network element utilization, and network link utilization. If traffic analysis indicates that a specific communications link is congested, for example, new traffic may be dynamically re-directed to another communications link.

Data may be characterized by statistical summary values, such as mean, median, maximum, and minimum. Finer-grained characterization may be provided by quantiles. As discussed above, one approach for statistical analysis entails capturing data, statically storing it in a database, and post-processing it. With large data streams, such as those generated in telecommunications networks, this approach may not always be viable because of the large amount of data storage and memory required. In addition, post-processing may be insufficient for real-time control. There is a trade-off between the accuracy in determining quantiles, required computational resources, and computational time. For real-time control, the rapid calculation of a good estimate of a quantile may be more useful than more time consuming calculation of a highly accurate value of a quantile, especially when the statistical distributions are dynamic. What are needed are method and apparatus for efficiently estimating quantiles from large volume data streams.

BRIEF SUMMARY OF THE INVENTION

In an embodiment, a quantile estimate of a data stream is calculated iteratively by calculating a first quantile estimate and then calculating a second quantile estimate by adding a first update increment to the first quantile estimate. A first observation sample is acquired. A first quantile estimate and a first standard deviation estimate are set to the sample quantile and the sample standard deviation of the first observation sample. A second observation sample is then acquired. A second standard deviation estimate is calculated based at least in part on the first standard deviation estimate and the sample standard deviation of the second observation sample. A first quantile update increment is calculated based at least in part on the second observation sample and based at least in part on the product of the second standard deviation estimate times a log odds ratio function.

These and other advantages of the invention will be apparent to those of ordinary skill in the art by reference to the following detailed description and the accompanying drawings.

DETAILED DESCRIPTION

Figure 1:
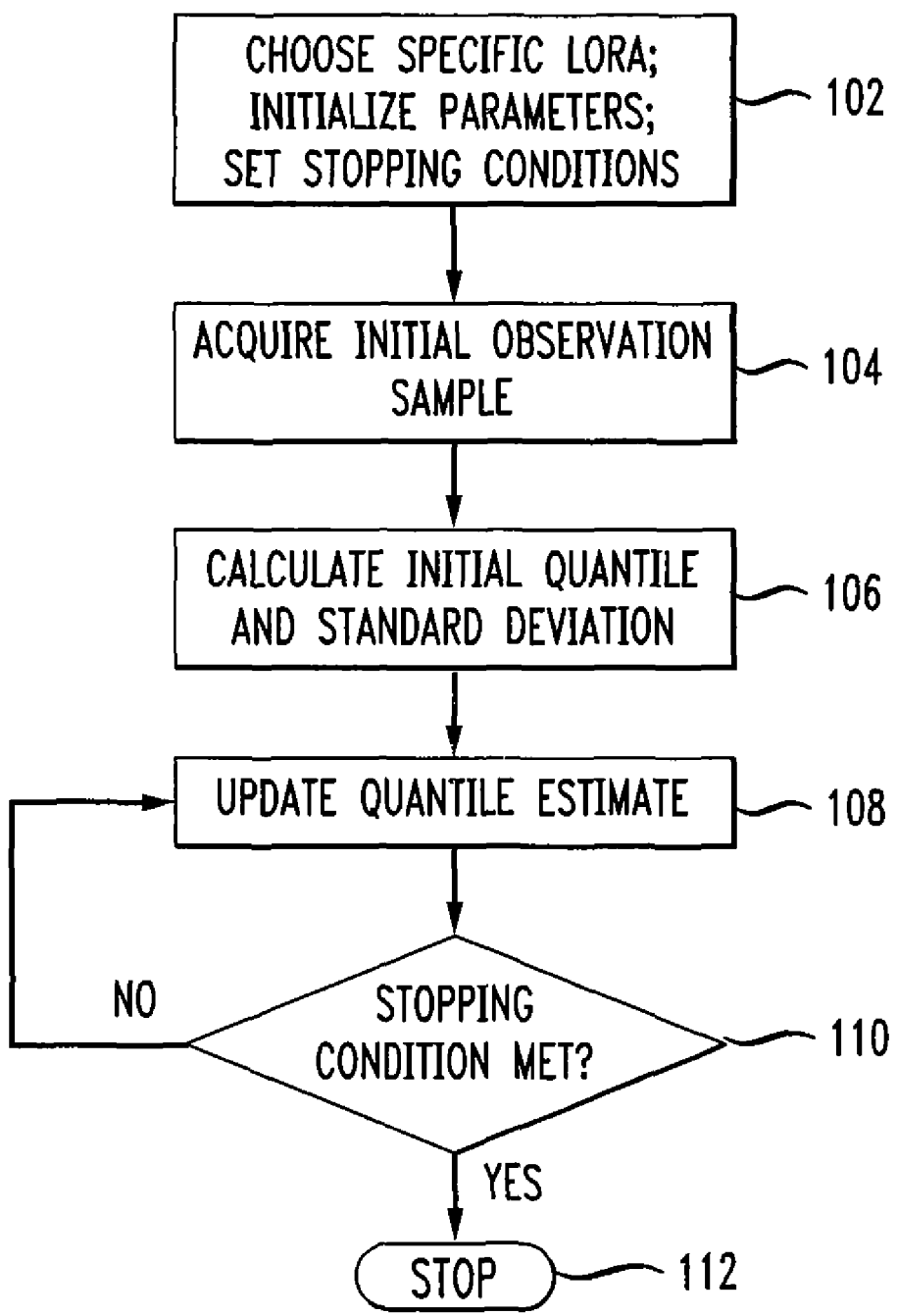
FIG. 1 shows a flowchart of steps for estimating quantiles according to an embodiment of the Log Odds Ratio Algorithm.

Characterization of statistical data may be provided by summary values such as mean, median, maximum, and minimum. Finer-grained characterization may be provided by quantiles, commonly reported as percentiles. In telecommunications networks, for example, high percentile values are often used for traffic analysis, such as the $95^{th}$ percentile for call durations or the $99^{th}$ percentile for traffic load. In an embodiment, to reduce required computational resources (such as memory, storage space, and processor speed), and to reduce computational time, quantiles are estimated for stationary statistical distributions and estimated and tracked for dynamic statistical distributions. Herein, stationary (also referred to as steady-state) statistical distributions refer to statistical distributions that do not vary over time, and dynamic statistical distributions refer to statistical distributions that do vary over time.

Herein, a data stream refers to a time series of measured values of a parameter of interest. A data stream may be generated in real-time or near-real-time. Herein, quantiles calculated from a set of measured values captured from a data stream are also referred to as quantiles of a data stream. In an embodiment, static quantiles are estimated and dynamic quantiles are estimated and tracked iteratively. A first quantile estimate is first calculated. A second quantile estimate is then calculated as the sum of the first quantile estimate and a first update increment. Similarly, a third quantile estimate is calculated as the sum of the second quantile estimate and a second update increment.

In an embodiment, the update increment is calculated using a fixed-point algorithm referred to herein as Log Odds Ratio Algorithm (LORA), that uses the observed fractions of measurements exceeding the most recent quantile estimate to update the estimate value. In contrast to prior-art methods, the unknown probability density function at the quantile is not estimated. Instead of the Newton-Raphson approach, the algorithm uses the log-odds transformation of the observed fractions and smoothed estimates of the standard deviation to update the quantile estimate. These data are generally available when monitoring stochastic processes. The algorithm stores only the most recent estimates of standard deviation and quantile. For large data streams, this can significantly reduce the amount of data collected and the complexity of data analysis and storage. Illustrative embodiments for three classes of statistical distributions are described below.

In an embodiment, both the cumulative distribution function F and the standard deviation s are known. Let denote $T_p$ denote the true but unknown $p^{th}$ quantile value:

$$F(T_p)=p, \text{ and } q=1-p \qquad (E1)$$

An updated quantile estimate is calculated from a previous quantile estimate by a method referred to herein as the Log Odds Ratio Algorithm (LORA), which may be represented by the mathematical relationship:

$$\hat{T}_{new} = h(\hat{T}_{old}) = \hat{T}_{old} + s \times q \times \ln\left(\frac{(1 - F(\hat{T}_{old}))}{F(\hat{T}_{old})} \times \frac{p}{q}\right), \quad (E2)$$

where the function $h(\hat{T}_{old})$ transforms the previous quantile estimate $\hat{T}_{old}$ to the updated quantile estimate $\hat{T}_{new}$. Under the stated conditions (both the cumulative distribution function F and the probability density function $f$ are known), the quantity $$\left(\frac{(1 - F(\hat{T}_{old}))}{F(\hat{T}_{old})} \times \frac{p}{q}\right)$$

is the odds ratio and $$\ln\left(\frac{(1 - F(\hat{T}_{old}))}{F(\hat{T}_{old})} \times \frac{p}{q}\right)$$

is the log odds ratio function.

The following properties and relationships hold:

$h(T_p) = T_p$, that is, $T_p$ is a fixed point of $h$ (E3)

for $T > T_p$, $h(T) < T$, and for $T < T_p$, $h(T) > T$ (E4)

$$\frac{\partial h(T)}{\partial T} = 1 - sq\left(\frac{f(T)}{(1 - F(T))F(T)}\right), \quad (E5)$$

where $f(T)$ is a probability density function

When the following condition (E6) is satisfied, LORA converges, i.e., an interval I exists such that $T_p$ belongs to I, and, for any initial $T_{init}$ chosen within I, the algorithm converges to the true quantile value $T_p$.

$$\text{At } T_p, \left|\frac{\partial h(T_p)}{\partial T}\right| < 1 \Leftrightarrow 0 < sf(T_p) < 2p \quad (E6)$$

For several commonly used distributions, condition (E6) is satisfied for the typically sought $T_p$, i.e., for larger values of p, such as the $95^{th}$ percentile. For example, In an Exponential distribution with mean μ, condition (E6) is equivalent to requiring 0<q<2p. This condition is generally satisfied for larger values of p regardless of the value of μ.

In a Normal distribution with mean μ and standard deviation σ, condition (E6) is equivalent to $$0 < \frac{1}{\sqrt{2\pi}} e^{-\frac{1}{2}\left(\frac{T_p - \mu}{\sigma}\right)^2} < 2p$$

It is generally satisfied for larger values of p regardless of the values of μ and σ.

In a Weibull distribution with shape parameter c and scale parameter 1, condition (E6) is equivalent to $$0 < \sqrt{\Gamma\left(\frac{2}{c} + 1\right) - \Gamma\left(\frac{1}{c} + 1\right)^2} \, cT_p^{c-1} e^{-T_p^c} < 2p$$

When c>0.2, this condition is satisfied for all $p^{th}$ quantiles with p>0.9 and algorithm convergence is expected. For quantiles with the smaller p-values larger c-values may be required. For example, the algorithm is expected to converge to the true value of median, $T_{0.5}$, when c>0.61.

In some instances, (E2) may converge slowly. For example, in some simulations with model distributions, it takes 66 iterations to achieve 1% relative error when estimating the $95^{th}$ percentile for the Exp(1) distribution, if the starting value $T_{init}$ is 2. In an embodiment, the rate of convergence may be increased by including a gain function:

$$\hat{T}_{new} = h(\hat{T}_{old}) = \hat{T}_{old} + s \times q \times \ln\left(\frac{(1 - F(\hat{T}_{old}))}{F(\hat{T}_{old})} \times \frac{p}{q}\right) \times \text{gain.} \quad (E7)$$

In an embodiment, the gain function gain is a constant factor. If a gain factor of 10 is used, for example, the algorithm reaches 1% relative error after only six iterations. The choice of a gain factor or gain function is advantageous for tracking a stochastic process.

In an embodiment, the cumulative distribution function F is stationary, but unknown. Let $(x_{i1}, x_{i2} \ldots x_{iM})$ denote the it observation sample of size M from an unknown distribution F. Herein, an observation refers to a measured value of a parameter of interest, and an observation sample refers to a set of measured values. As an example, $(x_{i1}, x_{i2} \ldots x_{iM})$ may represent M consecutive measured values. For example, if the parameter of interest is packet delay time (measured in units of milliseconds), an example of an observation is 256. An example of an observation sample of size 6 is (234, 192, 506, 256, 150, 312). Herein, the quantile calculated from the values of an observation sample is also referred to as the sample quantile. Herein, the standard deviation calculated from the values of an observation sample is also referred to as the sample standard deviation. For example, if the observation sample is (234, 192, 506, 256, 150, 312), then the sample quantile is the quantile of (234, 192, 506, 256, 150, 312), and the sample standard deviation is the standard deviation of (234, 192, 506, 256, 150, 312). Similarly, if the $i^{th}$ observation sample is $(x_{i1}, x_{i2} \ldots x_{iM})$, the sample quantile is the quantile of $(x_{i1}, x_{i2} \ldots x_{iM})$, and the sample standard deviation is the standard deviation of $(x_{i1}, x_{i2} \ldots x_{iM})$.

Let $n_{i, \hat{T}_{i-1}}$ denote the number of observations in the $i^{th}$ observation sample that are larger than a given threshold, $\hat{T}_{i-1}$. Let $\hat{s}_i$ denote the most recent estimate of the standard deviation, obtained, for example, via Exponential Weighting (EW):

$$\hat{s}_i = \omega \times \hat{s}_{i-1} + (1-\omega) \times s_i, \quad (E8)$$

where $\hat{s}_{i-1}$ is a previous EW estimate of the standard deviation and $s_i$ is the sample standard deviation of the $i^{th}$ observation sample. The parameter ω is a weighting factor. For example, ω=0.95.

The sample estimates for known p and q (where $p=F(T_p)$ and q=1−p) are constructed as:

$$\hat{p}_i = (M - n_{i, \hat{T}_{i-1}} + 0.5)/(M+1) \quad (E9)$$

$$\hat{q}_i = 1 - \hat{p}_i \quad (E10)$$

In place of (E2), the update procedure for the quantile estimate is now:

$$\hat{T}_i = \hat{T}_{i-1} + \hat{s}_i \times q \times \ln\left(\frac{\hat{q}_i}{\hat{p}_i} \times \frac{p}{q}\right) \times \text{gain} \quad \text{(E11)}$$

Under the stated conditions (cumulative distribution function F is stationary, but unknown), $$\left(\frac{\hat{q}_i}{\hat{p}_i} \times \frac{p}{q}\right)$$

is the odds ratio and $$\ln\left(\frac{\hat{q}_i}{\hat{p}_i} \times \frac{p}{q}\right)$$

is the log odds ratio function.

For larger gain values, the algorithm will converge quicker, but the variation in the steady state will be larger. Similarly, for smaller gain values, the algorithm will converge slower, but the variation in the steady state will be smaller. In a fixed steady-state case, it is advantageous to reduce the contribution of later observations, to reduce the estimation error. Reducing the contribution of later observations may be accomplished by defining the gain function as a decreasing positive function of the sample index i, for example, as $1/\sqrt{i}$. Then, the quantile update procedure becomes:

$$\hat{T}_i = \hat{T}_{i-1} + \hat{s}_i \times q \times \ln\left(\frac{\hat{q}_i}{\hat{p}_i} \times \frac{p}{q}\right) \times \frac{1}{\sqrt{i}} \quad \text{(E12)}$$

The gain factor is defined differently for a non-stationary case, as discussed below.

In an embodiment, the cumulative distribution function F is both unknown and dynamic. Since the distribution function is dynamic (i.e., changing with time), the most recent observations may better represent underlying distribution than older ones. To track changes in the underlying distributions, the weights for new observations should not shrink to zero. There are many possibilities for such weight adjustment. An advantageous embodiment uses a smoothing function. One skilled in the art may develop embodiments using other weight adjustments. For these conditions, in place of (E2), the quantile update procedure is $$\hat{T}_i = \hat{T}_{i-1} + \hat{s}_i \times q \times \ln\left(\frac{\hat{q}_i}{\hat{p}_i} \times \frac{p}{q}\right) \times \text{gain} \times \text{smooth} \quad \text{(E13)}$$

$$\hat{p}_i = (M - n_{i,\hat{T}_{i-1}} + 0.5)/(M+1) \quad \text{(E14)}$$

$$\hat{q}_i = 1 - \hat{p}_i \quad \text{(E15)}$$

$$\hat{s}_i = \omega \times \hat{s}_{i-1} + (1-\omega) \times s_i \quad \text{(E16)}$$

where $$\left(\frac{\hat{q}_i}{\hat{p}_i} \times \frac{p}{q}\right)$$

is the odds ratio, $$\ln\left(\frac{\hat{q}_i}{\hat{p}_i} \times \frac{p}{q}\right)$$

is the log odds ratio function,
smooth=smoothing function
$n_{i,\hat{T}_{i-1}}$=number of observations $x_{ij}$ in $i^{th}$ sampler ($x_{i1}$, $x_{i2}$, $x_{iM}$) such that $x_{ij} > \hat{T}_{i-1}$.

In an embodiment the smoothing function is chosen as a constant factor, i.e., smooth=$(1-\beta)$.

As in (E8), $s_{i-1}$ is a previous EW estimate of the standard deviation and $s_i$ is the sample standard deviation of the $i^{th}$ observation sample. In an embodiment, the following illustrative values may be used: gain=10, $\beta$=0.95, $\omega$=0.95, and M=100. One skilled in the art may choose values suited for specific measurement scenarios.

FIG. 1 shows a flowchart of steps for estimating quantiles by LORA. In step 102, a specific LORA is chosen, based, for example, on a priori historical knowledge. For example, the cumulative distribution function F and the probability density function $f$ may be well known for parameters, such as call setup time and call volume, which characterize voice calls in traditional circuit-switched networks run by major service providers. In a packet data network, however, there is a smaller historical database, network equipment and architecture are often ill-defined (no central operations, administration, maintenance, and provisioning), and traffic usage is often erratic (especially with the advent of streaming audio, streaming video, and high traffic to specific websites during special events). Choice of the simplest LORA [such as from the group represented in (E7), (E11), and (E13)] reduces computational overhead and reduces computational response time. One skilled in the art may develop other embodiments of LORA optimized for specific measurement scenarios. The measurement scenario in which F and f are unknown and dynamic is the most general and should be chosen, for dynamic distribution functions, or in cases with no available a priori information about distribution functions. Note that, in general, the following possibilities hold:

For each measurement session, more than one data stream may be characterized.

For each data stream, more than one parameter may be measured.

For each parameter, more than one quantile may be estimated.

For each quantile, a different LORA may be used.

In step 102, a specific LORA is chosen, and parameters in the algorithm are initialized. In (E13)-(E16), for example, initial values of gain, $\beta$, $\omega$, and M are set. These values may be set heuristically. They may also be set, for example, based on modelling and simulation studies. One skilled in the art may choose initial values suited for specific measurement scenarios. A stopping condition (or, in general, a set of stopping conditions), if any, for the calculations are also set in step 102. For continuous tracking of a quantile estimate in a continuous data stream, a stopping condition may not need to be set. In other instances, a stopping condition may be set heuristically, or based on various user-specified criteria, such as a fixed number of observations, a fixed observation time, or fixed number of iterations. One skilled in the art may specify stopping conditions optimized for different measurement scenarios.

The process then passes to step 104, in which an initial observation sample is acquired. The initial observation sample may be characterized by various user-defined criteria. An initial observation sample of a fixed size, for example, may be acquired. As another example, an initial observation sample may be acquired over a fixed time interval.

The process then passes to step 106, in which an initial quantile estimate is calculated from the sample quantile of the initial observation sample. One skilled in the art may apply various methods for calculating an initial quantile estimate. Using the example of an unknown dynamic distribution [(E13)-(E16)], an initial observation sample of size M observations is acquired:

$$\vec{x}_0 = (x_{01}, x_{02}, \ldots, x_{0M}). \quad (E17)$$

From this observation sample, a sample quantile $T_0$ of the parameter of interest is calculated, and used as the initial quantile estimate. A sample standard deviation is also calculated, and used as the initial standard deviation estimate:

$$s_0 = \text{stdev}(x_{01}, x_{02}, \ldots, x_{0M}). \quad (E18)$$

The process then passes to step 108, in which the quantile estimate is iteratively updated according to an embodiment of LORA. Again using the example of an unknown dynamic distribution, the initial values of $T_0$ and $s_0$ calculated in step 106 are updated according to (E13)-(E16). After an update step, the process passes to step 110, in which a check against a stopping condition is performed (as discussed above, there may be none, one, or many stopping conditions). If a stopping condition is met, then the process passes to step 112, and the measurement process terminates. If a stopping condition is not met, then the process returns to step 108, in which another update step is performed.

Figure 2:
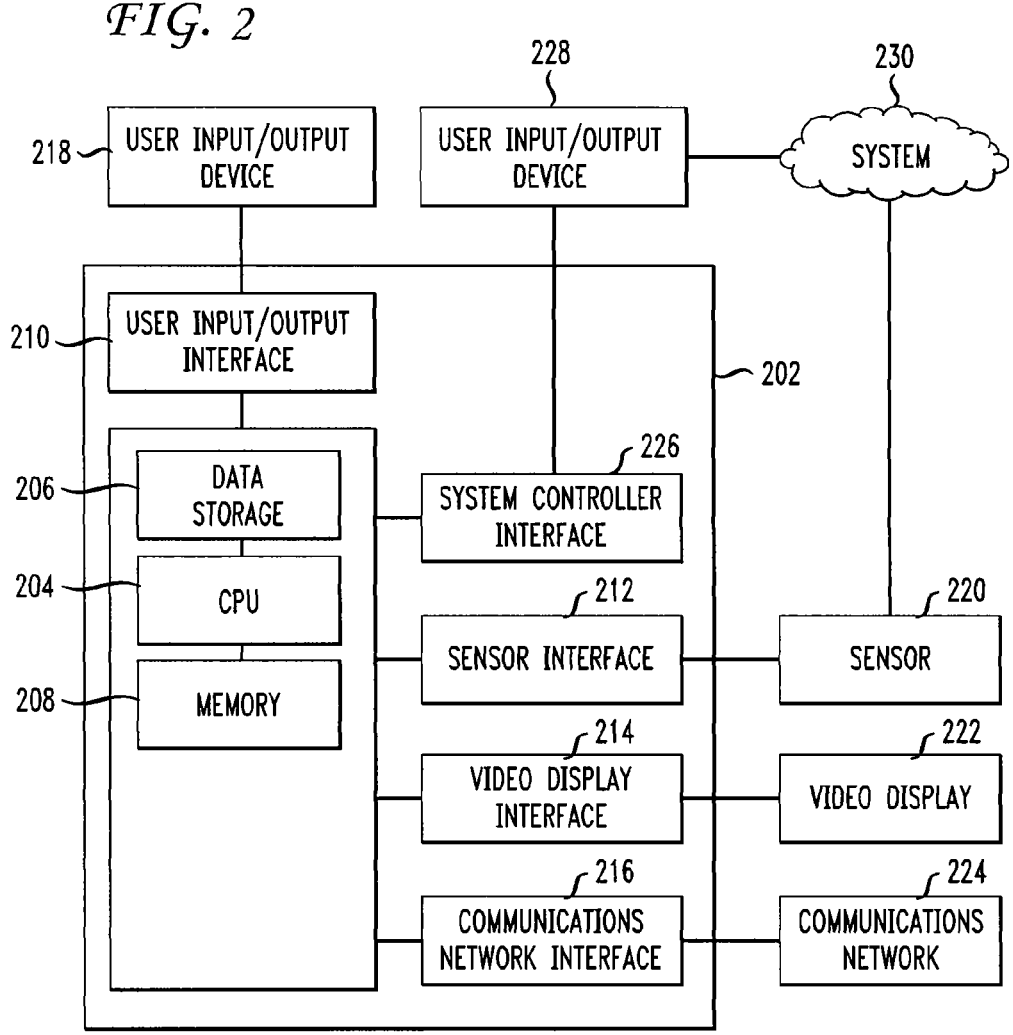
FIG. 2 shows a high-level schematic of a computer which may be used to execute instructions to estimate quantiles according to an embodiment of the Log Odds Ratio Algorithm.

One embodiment of a data analysis system which performs quantile estimation may be implemented using a computer. As shown in FIG. 2, computer 202 may be any type of well-known computer comprising a central processing unit (CPU) 204, memory 208, data storage 206, and user input/output interface 210. Data storage 206 may comprise a hard drive, non-volatile memory, or other computer readable media. User input/output interface 210 may comprise a connection to a user input device 218, such as a keyboard or mouse. Video display interface 214 may transform signals from CPU 204 to signals which may drive video display 222. As is well known, a computer operates under control of computer software which defines the overall operation of the computer and applications. CPU 204 controls the overall operation of the computer and applications by executing computer program instructions which define the overall operation and applications. The computer program instructions may be stored in data storage 206 and loaded into memory 208 when execution of the program instructions is desired. For example, computer instructions for estimating quantiles via LORA may be stored in data storage 206. Computers are well known in the art and will not be described in detail herein.

Computer 202 may further comprise one or more network interfaces. For example, communications network interface 216 may comprise a connection to communications network 224, which may be a circuit-switched or a packet data network. Communications network 224 may transport user traffic and network characterization data streams. For example, data transmitted from communications network 224 may be a data stream characterizing traffic parameters. This data stream may be analyzed by LORA. For example, network equipment (such as routers and switches) may report values of traffic parameters such as call volumes, call durations, port utilization, and link utilization within communications network 224. Traffic parameters may also be reported by network probes (not shown) within communications network 224. In an embodiment, in response to a quantile estimate, a traffic controller (not shown) in communications network 224, may re-direct traffic flow. For example, if the $90^{th}$ percentile of data flow rate into a specific router port exceeds a user-specified threshold, the traffic controller may issue commands or instructions to direct new data traffic to a different router port. As another example, if the $95^{th}$ percentile of calls at a call center exceeds a user-specified threshold, the traffic controller may direct new calls to a different call center.

Computer 202 may further comprise a sensor interface 212, which may transform incoming signals from sensor 220 to signals capable of being processed by CPU 204. Computer 202 may further comprise a system controller interface 226, which provides a connection to a system controller 228. In an embodiment, sensor 220 measures values of system variables in system 230. In general, sensor 220 may represent a set of sensors which measures values of a set of system variables. The measured values are input as a data stream to computer 202 via sensor interface 212. The data stream characterizes the system variables. Computer 202 then calculates quantile estimates of the system variables via LORA. The quantile estimates are output from computer 202 to system controller 228 via system controller interface 226. In response to the quantile estimates, system controller 228 adjusts the values of the system variables in system 230.

For example, system 230 may represent an industrial processing plant. Sensor 220 may measure process variables such as temperature and pressure. In response to quantile estimates of the temperature and pressure, system controller 228 may adjust the values of the temperature and pressure in system 230. For example, if the $95^{th}$ percentile of temperature measurements exceeds a user-specified value, the system controller may issue commands or instructions to lower the temperature. As another example, if the $90^{th}$ percentile of pressure measurements drop below a user-specified threshold, the system controller may issue commands or instructions to increase the pressure.

One skilled in the art may develop embodiments for using quantile estimates to characterize or control other systems.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for calculating by a computer a quantile estimate of a data stream, comprising the steps of:
    calculating a first quantile estimate based at least in part on a first sample quantile calculated from a first observation sample;
    calculating a first standard deviation estimate based at least in part on a first sample standard deviation calculated from the first observation sample;

calculating a second sample standard deviation from a second observation sample;
calculating a second standard deviation estimate based at least in part on the first standard deviation estimate and the second sample standard deviation;
calculating a first update increment based at least in part on the second observation sample and based at least in part on the product of the second standard deviation estimate times a first value of a log odds ratio function; and
calculating a second quantile estimate as the sum of the first quantile estimate plus the first update increment.

2. The method of claim 1, further comprising the steps of:
calculating a third sample standard deviation estimate from a third observation sample;
calculating a third standard deviation estimate based at least in part on the second standard deviation estimate and the third sample standard deviation;
calculating a second update increment based at least in part on the third observation sample and based at least in part on the product of the third standard deviation estimate times a second value of the log odds ratio function; and
calculating a third quantile estimate as the sum of the second quantile estimate plus the second update increment.

3. The method of claim 2, wherein the step of calculating a third standard deviation estimate is performed according to:

$$\hat{s}_3 = \omega \times \hat{s}_2 + (1-\omega) \times s_3,$$

where
$\hat{s}_3$ is the third standard deviation estimate,
$\omega$ is a weighting factor,
$\hat{s}_2$ is the second standard deviation estimate, and
$s_3$ is the third sample standard deviation.

4. The method of claim 3, wherein the step of calculating a second update increment and the step of calculating a third quantile estimate is performed according to:

$$\hat{T}_3 = \hat{T}_2 + \hat{s}_3 \times q \times \ln\left(\frac{\hat{q}_i}{\hat{p}_i} \times \frac{p}{q}\right) \times \text{gain}$$

$$\hat{p}_3 = \left(M - n_{3,\hat{T}_2} + 0.5\right)/(M+1)$$

$$\hat{q}_3 = 1 - \hat{p}_3$$

where
$\hat{T}_3$ is the third quantile estimate,
$\hat{T}_2$ is the second quantile estimate,
p designates the $p^{th}$ quantile,
q=1−p,
gain=a gain function,
$\vec{x}_3 = (x_{31}, x_{32} \ldots x_{3j} \ldots, x_{3M})$ is the third observation sample
where M is the number of observations in the third observation sample,
$n_{3,\hat{T}_2}$=number of observations $x_{3j}$ in the third observation sample such that $x_{3j} > \hat{T}_2$, where $\hat{T}_2$ is a threshold value estimated during previous iteration.

5. The method of claim 4, wherein
the gain function is a first constant factor.

6. The method of claim 4, wherein
the gain function is multiplied by a smoothing function.

7. The method of claim 6, wherein
the smoothing function is a second constant factor.

8. The method of claim 4, wherein
the gain function is $1/\sqrt{i}$.

9. The method of claim 1, wherein said data stream characterizes a traffic parameter in a communications network.

10. The method of claim 9, further comprising the step of:
re-directing traffic in response to the quantile estimate.

11. The method of claim 1, wherein said data stream characterizes a system variable in a system.

12. The method of claim 11, further comprising the step of:
adjusting a value of the system variable in response to the quantile estimate.

13. An apparatus for calculating a quantile estimate of a data stream, comprising:
means for calculating a first quantile estimate based at least in part on a first sample quantile calculated from a first observation sample;
means for calculating a first standard deviation estimate based at least in part on a first sample standard deviation calculated from the first observation sample;
means for calculating a second sample standard deviation from a second observation sample;
means for calculating a second standard deviation estimate based at least in part on the first standard deviation estimate and the second sample standard deviation;
means for calculating a first update increment based at least in part on the second observation sample and based at least in part on the product of the second standard deviation estimate times a first value of a log odds ratio function; and
means for calculating a second quantile estimate as the sum of the first quantile estimate plus the first update increment.

14. The apparatus of claim 13, further comprising:
means for calculating a third sample standard deviation estimate from a third observation sample;
means for calculating a third standard deviation estimate based at least in part on the second standard deviation estimate and the third sample standard deviation;
means for calculating a second update increment based at least in part on the third observation sample and based at least in part on the product of the third standard deviation estimate times a second value of the log odds ratio function; and
means for calculating a third quantile estimate as the sum of the second quantile estimate plus the second update increment.

15. The apparatus of claim 14, wherein the means for calculating a third standard deviation estimate further comprises means for calculating:

$$\hat{s}_3 = \omega \times \hat{s}_2 + (1-\omega) \times s_3,$$

where
$\hat{s}_3$ is the third standard deviation estimate,
$\omega$ is a weighting factor,
$\hat{s}_2$ is the second standard deviation estimate, and
$s_3$ is the third sample standard deviation.

16. The apparatus of claim 15, wherein the means for calculating a second update increment and the means for calculating a third quantile estimate further comprise means for calculating:

$$\hat{T}_3 = \hat{T}_2 + \hat{s}_3 \times q \times \ln\left(\frac{\hat{q}_i}{\hat{p}_i} \times \frac{p}{q}\right) \times \text{gain}$$

$$\hat{p}_3 = \left(M - n_{3,\hat{T}_2} + 0.5\right)/(M+1)$$

$$\hat{q}_3 = 1 - \hat{p}_3$$

where
$\hat{T}_3$ is the third quantile estimate,
$\hat{T}_2$ is the second quantile estimate,
p designates the $p^{th}$ quantile,
q=1−p,
gain=a gain function,
$\vec{x}_3=(x_{31}, x_{32}, \ldots x_{3j} \ldots, x_{3M})$ is the third observation sample
  where M is the number of observations in the third observation sample,
$n_{3,\hat{T}_2}$=number of observations $x_{3j}$ in the third observation sample such that $x_{3j} > \hat{T}_2$, where $\hat{T}_2$ is a threshold value estimated during previous iteration.

17. The apparatus of claim 13, wherein said data stream characterizes a traffic parameter in a communications network.

18. The apparatus of claim 17, further comprising:
means for re-directing traffic in response to the quantile estimate.

19. The apparatus of claim 13, wherein said data stream characterizes a system variable in a system.

20. The apparatus of claim 19, further comprising:
means for adjusting a value of the system variable in response to the quantile estimate.

21. A non-transitory computer readable medium storing computer program instructions that are executable by a computer processor for calculating a quantile estimate of a data stream, said computer program instructions defining the steps of:
calculating a first quantile estimate based at least in part on a first sample quantile calculated from a first observation sample;
calculating a first standard deviation estimate based at least in part on a first sample standard deviation calculated from the first observation sample;
calculating a second sample standard deviation from the second observation sample;
calculating a second standard deviation estimate based at least in part on the first standard deviation estimate and the second sample standard deviation;
calculating a first update increment based at least in part on the second observation sample and based at least in part on the product of the second standard deviation estimate times a first value of a log odds ratio function; and
calculating a second quantile estimate as the sum of the first quantile estimate plus the first update increment.

22. The non-transitory computer readable medium of claim 21, wherein the computer program instructions that are executable by the computer processor for calculating a quantile estimate of a data stream further comprise computer program instructions defining the steps of:
calculating a third sample standard deviation estimate from a third observation sample;
calculating a third standard deviation estimate based at least in part on the second standard deviation estimate and the third sample standard deviation;
calculating a second update increment based at least in part on the third observation sample and based at least in part on the product of the third standard deviation estimate times a second value of the log odds ratio function; and
calculating a third quantile estimate as the sum of the second quantile estimate plus the second update increment.

23. The non-transitory computer readable medium of claim 22, wherein the computer program instructions defining the step of calculating a third standard deviation estimate further comprise computer program instructions for calculating:

$$\hat{s}_3 = \omega \times \hat{s}_2 + (1-\omega) \times s_3,$$

where
$\hat{s}_3$ is the third standard deviation estimate,
$\omega$ is a weighting factor,
$\hat{s}_2$ is the second standard deviation estimate, and
$s_3$ is the third sample standard deviation.

24. The non-transitory computer readable medium of claim 23, wherein the computer program instructions defining the step of calculating a second update increment and the step of calculating a third quantile estimate further comprise computer program instructions defining the steps of calculating:

$$\hat{T}_3 = \hat{T}_2 + \hat{s}_3 \times q \times \ln\left(\frac{\hat{q}_i}{\hat{p}_i} \times \frac{p}{q}\right) \times \text{gain}$$

$$\hat{p}_3 = (M - n_{3,\hat{T}_2} + 0.5)/(M+1)$$

$$\hat{q}_3 = 1 - \hat{p}_3$$

where
$\hat{T}_3$ is the third quantile estimate,
$\hat{T}_2$ is the second quantile estimate,
p designates the $p^{th}$ quantile,
q=1−p,
gain=a gain function,
$\vec{x}_3=(x_{31}, x_{32}, \ldots x_{3j} \ldots, x_{3M})$ is the third observation sample
  where M is the number of observations in the third observation sample,
$n_{3,\hat{T}_2}$=number of observations $x_{3j}$ in the third observation sample such that $x_{3j} > \hat{T}_2$ where $\hat{T}_2$ is a threshold value estimated during previous iteration.

25. The non-transitory computer readable medium of claim 21, wherein said data stream characterizes a traffic parameter in a communications network.

26. The non-transitory computer readable medium of claim 25, wherein the computer program instructions that are executable by the computer processor for calculating a quantile estimate further comprise computer program instructions defining the step of:
re-directing traffic in response to the quantile estimate.

27. The non-transitory computer readable medium of claim 21, wherein said data stream characterizes a system variable in a system.

28. The non-transitory computer readable medium of claim 27, wherein the computer program instructions that are executable by the computer processor for calculating a quantile estimate further comprise computer program instructions defining the step of:
adjusting a value of the system variable in response to the quantile estimate.

* * * * *

UNITED STATES PATENT AND TRADEMARK OFFICE
CERTIFICATE OF CORRECTION

PATENT NO. : 8,000,929 B2
APPLICATION NO. : 12/229941
DATED : August 16, 2011
INVENTOR(S) : Yury Bakshi and David Arthur Hoeflin It is certified that error appears in the above-identified patent and that said Letters Patent is hereby corrected as shown below:

Column 3, line 59, "a", should read -- $\sigma$ --

Column 4, line 10, "p>0.9", should read -- $p \geq 0.9$ --

Column 4, line 32, "it", should read -- $i^{th}$ --

Column 6, lines 17, 18 "sampler ($x_{i1},x_{i2},x_{iM}$)", should read -- sample $\vec{x}_i = (x_{i1}, x_{i2}, ...., x_{iM})$ --

Column 6, line 21, "$s_{i-1}$)", should read -- $\hat{s}_{i-1}$ --

Column 9, line 40, claim 4, " $\hat{T}_3 = \hat{T}_2 + \hat{s}_3 \times q \times \ln\left(\dfrac{\hat{q}_i}{\hat{p}_i} \times \dfrac{p}{q}\right) \times gain$ ", should read -- $\hat{T}_3 = \hat{T}_2 + \hat{s}_3 \times q \times \ln\left(\dfrac{\hat{q}_3}{\hat{p}_3} \times \dfrac{p}{q}\right) \times gain$ --

Column 10, line 61, claim 16, " $\hat{T}_3 = \hat{T}_2 + \hat{s}_3 \times q \times \ln\left(\dfrac{\hat{q}_i}{\hat{p}_i} \times \dfrac{p}{q}\right) \times gain$ "

should read -- $\hat{T}_3 = \hat{T}_2 + \hat{s}_3 \times q \times \ln\left(\dfrac{\hat{q}_3}{\hat{p}_3} \times \dfrac{p}{q}\right) \times gain$ --

Column 12, line 22, claim 24, " $\hat{T}_3 = \hat{T}_2 + \hat{s}_3 \times q \times \ln\left(\dfrac{\hat{q}_i}{\hat{p}_i} \times \dfrac{p}{q}\right) \times gain$ "

should read -- $\hat{T}_3 = \hat{T}_2 + \hat{s}_3 \times q \times \ln\left(\dfrac{\hat{q}_3}{\hat{p}_3} \times \dfrac{p}{q}\right) \times gain$ --

Signed and Sealed this
Eleventh Day of October, 2011

David J. Kappos
*Director of the United States Patent and Trademark Office*